Feb. 18, 1969  T. J. YOUNG ET AL  3,428,133
LAND LEVELER
Filed Aug. 18, 1965  Sheet 1 of 5
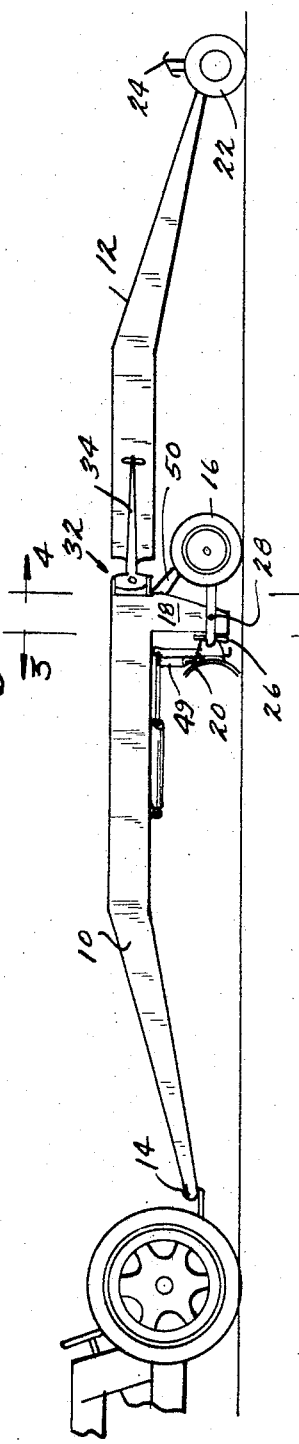
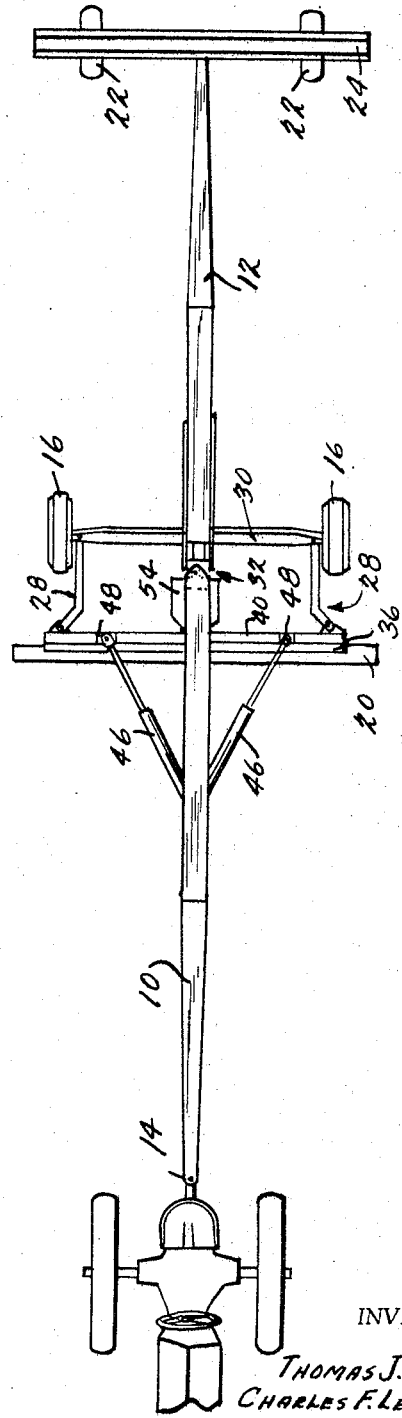
INVENTORS
THOMAS J. YOUNG
CHARLES F. LEONARD
CLAUDE H. LEONARD
BY Cushman, Darby & Cushman
ATTORNEYS

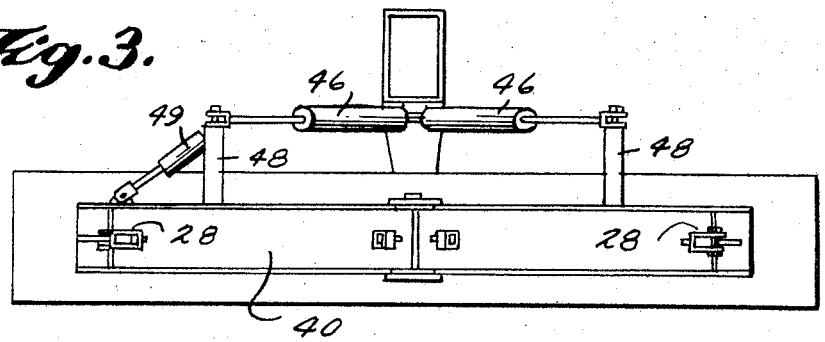
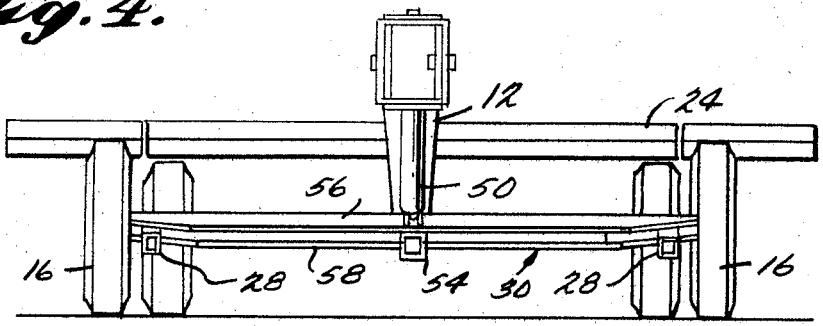
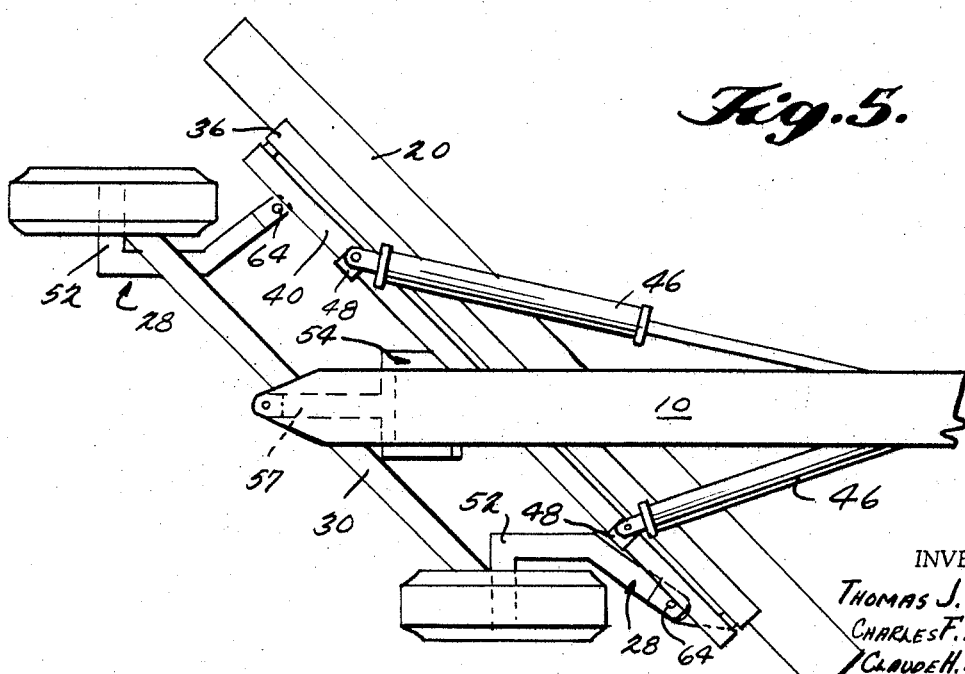

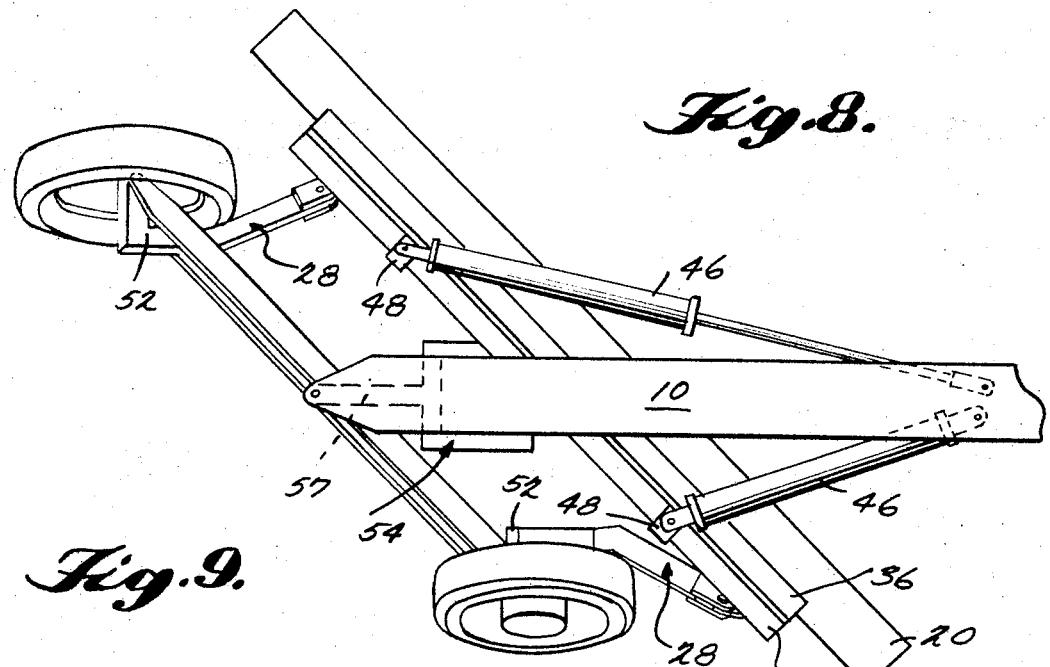
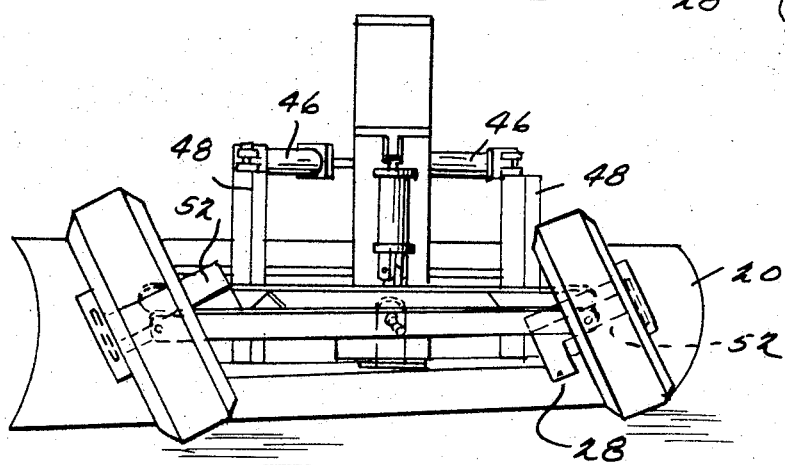
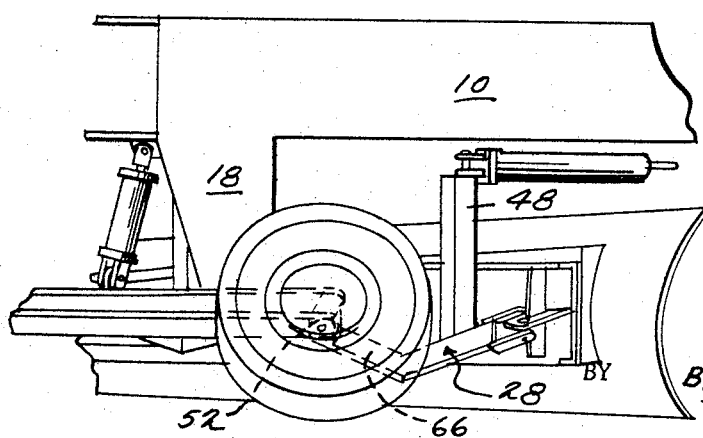

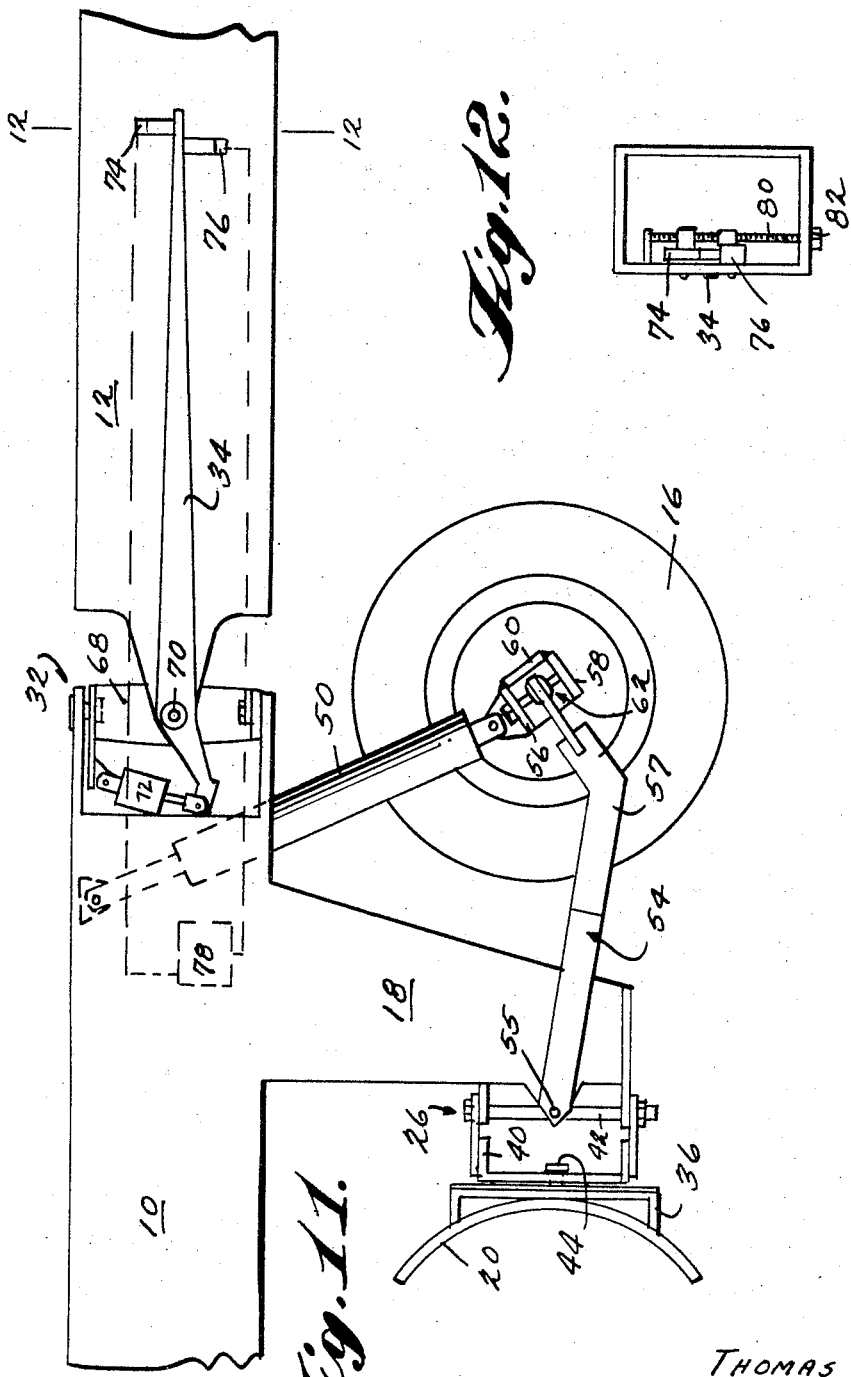

United States Patent Office 3,428,133
Patented Feb. 18, 1969

3,428,133
LAND LEVELER
Thomas J. Young, Rte. 1, Meridian, Idaho 83642, and
Charles F. Leonard, 7219 Swift Lane 83704, and
Claude H. Leonard, 8206 Fairview Ave. 83702, both
of Boise, Idaho
Filed Aug. 18, 1965, Ser. No. 480,747
U.S. Cl. 172—4.5                                    13 Claims
Int. Cl. E02f 3/76; A01b 63/22

ABSTRACT OF THE DISCLOSURE

An earth working device is provided with a frame and wheels for supporting the frame. Connecting arms are provided between the wheels and the frame for banking the wheels in proportion to a working angle of an earth working blade. Also, the width of track of supporting wheels of such a vehicle can be adjusted relative to the angle of cut of an earth working blade.

---

This invention relates to an earth working apparatus and particularly to a land leveler device for grading and working earth surfaces with a blade.

Land levelers are well known in the art and usually comprise a frame adapted to be drawn by a tractor or by self-propelling means, and the frame includes supporting wheels and carries an earth working blade or blades. The type of land leveler contemplated by this invention includes two frame sections which are coupled together so as to provide for pivotal movement of the frame sections in angular directions relative to each other. A forward frame section can be drawn by a tractor or other vehicle, and the forward frame carries an earth working blade which is adjustably mounted and automatically controlled in its cutting actions. A rear frame section trails behind the forward frame and carries a second blade which may be raised and lowered to complement the earth working action of the main blade carried by the forward frame.

Prior art types of land levelers have provided for a pivotal connection between frame sections and have provided for some means of mounting a blade on one of the frame sections for working earth. In the usual construction, the forward frame section is suspended above the ground by wheels which are mounted behind the earth working blade, and the wheels are spaced from one another on a horizontal axis so as to define a narrow track which is always less than the minimum cutting width of the earth working blade. Because of the narrow track of the wheels which support such land leveler frames, the land leveler is relatively unstable and care must be exercised in its use on difficult terrain.

The land leveler of this invention provides for a novel mounting of wheels on the forward frame section of the leveler device so as to provide for an automatic adjustment in the track of the wheels as related to a particular cutting width of the earth working blade which is carried by the forward frame section. The blade is adjustable about a vertical axis, and it can be positioned to work a normal maximum width cut when the blade is at right angles to the direction of travel of the land leveler, or the blade can be angled to work varying width cuts as related to the travel of the leveler device. The wheel mounting means of this invention provides for a change in track of the blade-supporting wheels so that the wheels adjust in their distance from one another in accordance with the width of cut being made by the blade. Thus, the wheels become spaced further apart when the blade is making a maximum width cut, and the wheels are spaced closer together for narrower cuts by the blade. This feature provides for greater stability of the land leveler device and permits a wider track of the supporting wheels during certain grading operations than is possible in prior art constructions.

The invention also provides for a particular mounting means for the wheels and the earth working blade so that the wheels can be adjusted in their track without the requirement for a telescoping axle. Additionally, the earth working blade and the supporting wheels are so related that the wheels are automatically banked in proportion to the angle of cut which is being made when the blade is lowered and when it is rotated about a vertical axis away from its normal setting at right angles to the line of travel. The banking of the wheels is limited to operations where the earth working blade is in a lowered, cutting position and when the blade is at an angle to its normal position as mentioned above. For all other positions of the blade, that is, when it is in its raised position or when it is cutting in its normal maximum width position at right angles to the line of travel, the wheels are returned to a vertical upright position.

The rear frame section of the land leveler is coupled to the front section so that the two sections may pivot relative to one another on vertical and horizontal axes. The vertical pivotal axis provides for lateral turns of the front section relative to the rear section, and these turns may be made at angles of up to 90°, and even more. The rear frame section carries a second blade which can be raised or lowered to act as a scraper or smoother to cooperate with the earth working and cutting operations of the main earth working blade carried by the forward frame section. A control lever is connected between the forward frame section and the rear frame section so as to translate vertical motions of the two frame sections relative to one another into a control function which maintains the earth working blade carried by the forward section at a predetermined level of operation. The control lever actuates switches in response to the varying vertical positions of the control lever arm relative to the rear frame section, and the switches determine the flow of hydraulic fluid, to a hydraulic cylinder which raises or lowers the front frame section and the blade carried by that section so as to maintain the working level of the cutting blade. In addition, manual controls are provided so that the position of the blade can be set and adjusted manually.

Another feature of the invention is the provision of a stabilized earth working blade which is supported at its center so as to be held in a stable position aligned with the central longitudinal axis of the land leveler for all angular cutting positions of the blade.

These and other advantages of this invention will become apparent in the more detailed discussion which follows; and in that discussion, reference will be made to the accompanying drawing in which:

FIGURE 1 is a side elevational view of a land leveler incorporating the features of this invention as connected to a tractor;

FIGURE 2 is a top plan view of the land leveler shown in FIGURE 1;

FIGURE 3 is a sectional view taken on line 3—3 of FIGURE 1;

FIGURE 4 is a sectional view taken on line 4—4 of FIGURE 1;

FIGURE 5 is a top plan view of the forward frame section of the land leveler showing the relationship of the supporting wheels to an earth working blade which is in its raised position;

FIGURE 8 is a top plan view of the forward frame section of the land leveler, similar to the view in FIGURE 5, but showing the relationship of the wheels to the blade when the blade is lowered for cutting;

FIGURE 9 is an end view of the FIGURE 8 position of the blade;

FIGURE 10 is a side elevational view showing the detailed relationship of the lowered blade to the banked wheels;

FIGURE 11 is a side elevational view of the pivotal connection between the forward and rear frame sections and showing the control lever linkage between the two sections;

FIGURE 12 is a cross-sectional view taken on line 12—12 of FIGURE 11; and

Figure 6:
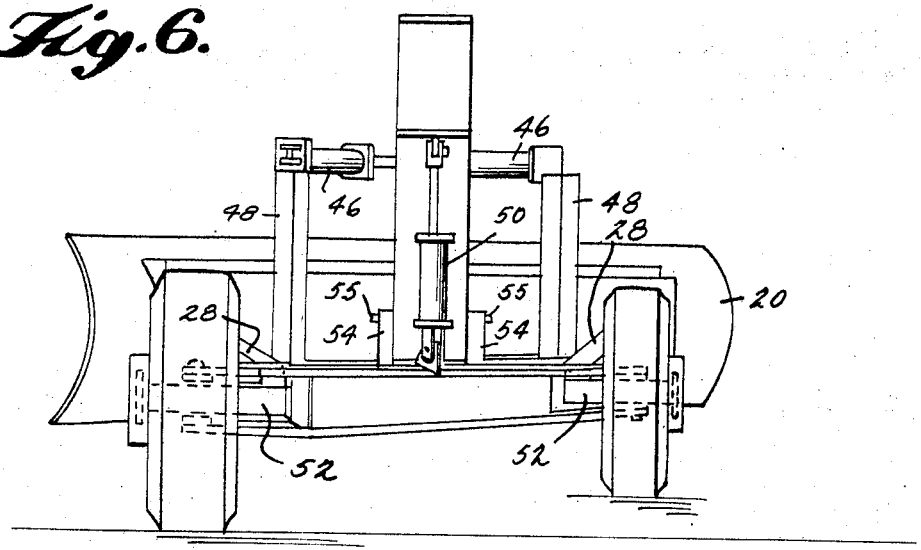
FIGURE 6 is an end view of FIGURE 5 showing the vertical positions of the wheels when the blade is raised.

FIGURES 1 and 2 illustrate the relationship between the sectional frame portions which make up the entire land leveler device of this invention. A forward frame section 10 is connected to a rear frame section 12 so that the connection point between the two sections is in the approximate middle of the entire land leveler. The forward frame section 10 includes a mounting device 14 at its leading edge so that it may be connected to a trailer or other vehicle, and the trailing end of the forward frame section is supported by wheels 16. The trailing portion of the forward frame section turns downwardly to provide a support column 18, and the wheels 16 are suspended behind this trailing portion of the forward frame. An earth working blade 20 is also carried by the forward frame section and is mounted for various movements and controls as related to the frame and to the wheels 16 in a manner which will be described in greater detail below. The rear frame section 12 is pivoted at its forward end to the trailing part of the forward frame section so that the two sections may pivot on horizontal and vertical axes relative to one another. The trailing end of the rear frame section 12 is supported by the trailing wheels 22, and a second blade means 24 may be carried at the end of the land leveler for smoothing over the cut made by the earth working blade 20. The second blade 24 is mounted to be raised and lowered so that it can be brought into and out of engagement with the cut being made by the forward blade 20. The entire land leveler is shown as being drawn by a tractor or other vehicle, but it is contemplated that such land levelers may be self-propelled or may include additional wheels at the forward end to aid in supporting the forward section of the frame.

Referring to FIGURE 2, it can be seen that the wheels 16 define a track which falls within the cutting width of the blade 20. The blade 20 is shown in its normal maximum width position at right angles to the forward motion of the land leveler, and in this position, the supporting wheels 16 are spread to their maximum tracking width. As will be described in a later discussion, the track of the wheels 16 adjusts so that the wheels always remain within the cut of the earth working blade 20, while maintaining maximum stability of the land leveler for all angular positions of the blade. In addition, the wheels 16 are banked under certain cutting conditions to compensate for lateral stresses which are applied to the cutting blade 20 in an earth removing operation. The width of track between the wheels 16 is adjusted by the movements of the blade 20 about a vertical axis defined by the pivotal mounting point 26 of the blade. The earth working blade 20 is linked at its outer ends to the wheels 16 through connecting arms 28. The wheels 16 are mounted at the ends of the connecting arms 28, and an axle assembly 30 is pivotally connected to the trailing ends of the connecting arms so as to maintain a parallelogram relationship between the blade 20, the connecting arms 28 and the axle assembly 30. Thus, for all angular displacements of the earth working blade 20 about a vertical axis, the axle assembly 30 with its wheels 16 are displaced a corresponding amount and at the same angle as the blade.

The pivotal connection between the forward frame section 10 and the rear frame section 12 is shown generally at 32 and includes vertical and horizontal pivot members which permit angular movements of the forward and rear frame sections relative to one another in both vertical and horizontal planes. The pivotal connection 32 also includes a control arm 34 which extends rearwardly from the connection point between the forward and rear frame sections to a point on the rear frame section. The control arm 34 receives changes in vertical motion of the rear section 12 relative to the forward frame section 10, and these changes in motion are translated by switching devices into movements that affect the position of the forward frame section 10 relative to the supporting wheels 16. It should be noted that the control arm 34 remains on a plane which is fixed relative to the horizontal plane of the forward frame section 10, but which may move in lateral angles within that plane for any turning motions of the forward frame section 10 relative to the rear frame section 12.

Looking to the detailed mounting of the earth working blade 20, the blade is provided with a blade-mounting channel 36 which is rigidly welded or affixed to a back face of the blade 20 so as to form a mounting and support member for connecting the blade to the forward frame section 10. The forward frame section 10 includes a downturned portion 18 which is integral with the frame and which forms a support for carrying the blade 20. The downturned member 18 includes mounting means at its forward end for pivotally mounting a blade backing member 40. The blade backing member 40 is mounted to turn about a vertical axis as determined by the mounting pin 42 which connects the blade backing member 40 to the downturned member 18 of the forward frame. The pivotal mounting of the blade backing member permits rotational movements of a blade mounted thereto about the vertical axis of the pin 42. The blade is mounted to the backing member 40 by a separate pin means 44 which interconnects the blade mounting member 36 with the blade backing member 40. The mounting pin 44 is placed on a horizontal axis at a central position relative to the entire width of the blade so that the blade may be tilted in rotational movements about the horizontal axis of the pin means 44. The separate pins 44 may be of any conventional construction which provides for a coupling of two members while at the same time providing for pivotal movements of the members relative to one another. Suitable bearing devices and locking means may be included with the pins 42 and 44 to maintain the pivotal connections just described. Referring to FIGURES 2 and 3, hydraulic control cylinders are shown in their various positions for actuating the earth working blade 20 to its various positions about the vertical and horizontal axes determined by the pins 42 and 44 respectively. The hydraulic piston and cylinder means 46 are connected between a forward portion of the frame 10 and to upright mounting posts 48 carried in lateral positions on the blade 20. The mounting posts 48 are rigidly connected to the blade backing member 40 near the outer extremities of that member so that the hydraulic cylinders 46 can be actuated to rotate the blade in a horizontal plane about the vertical axis of mounting pin 42. The hydraulic cylinders 46 are used to adjust the blade for all of its angular positions in a horizontal plane, and this adjustment determines the width of cut which is made by the blade 20, and also the direction that material is moved away from the worked area of earth through which the blade has passed. Since the blade mounting means 36 and its blade 20 are rigidly connected to the blade backing member 40, rotational movements applied to the backing member 40 result in the same movements being applied to the blade itself. Hydraulic cylinder means 49 is interconnected between one of the mounting posts 48 and the blade mounting member 36. Thus, retraction and extension of the hydraulic cylinder means 49 results in rotational movements in a vertical plane about the horizontal axis of pin 44 for the mounting member 36 and the attached blade 20. Such movements can be applied to the blade to cause the blade to cut on an angle which is out of the normal horizontal cutting position for the entire blade.

The mounting means just described provide for various angular movements of the blade in vertical and horizontal planes as carried by the forward frame section 10. The blade is pivoted from centrally located axes which provide for a rugged mounting of the blade while permitting movement to the various desired angles of cut. For all angular positions of the blade, the mounting remains stable because of its position in the center backing portion of the blade means 20. Vertical movements of the entire blade assembly are determined by the distance that the forward frame section 10 is raised and lowered over the earth upon which it is traveling. The vertical movement of the forward frame section 10 and its mounted earth working blade 20 is actuated by the hydraulic cylinder means 50 which adjusts the distance between the supporting wheels 16 and the frame 10.

As shown in FIGURES 1 and 11, the supporting wheels 16 are carried rearwardly of the main blade 20 so as to support the forward frame section 10 and the blade which is connected thereto. The supporting wheels 16 are mounted on separate stub axles 52 and these axles are rigidly connected to the trailing ends of the separate connecting arms 28 which link the supporting wheels to opposite ends of the blade means 20. In order to assure a proper tracking and alignment of the supporting wheels 16 behind and below the frame section 10, a yoke member 54 is pivotally mounted to the downturned portion 18 of the forward frame section 10 and to a center point of the axle assembly 30 which interconnects the two support wheels 16. The yoke member 54 is constructed to straddle opposite sides of the frame 18 so as to move up and down about its horizontal pivot point 55 which is in the form of a pin device. As seen in FIGURE 11, the yoke 54 includes a single trailing part 57 which is coupled to the axle assembly at a center point of that assembly. A hydraulic cylinder means 50 is connected between a trailing end portion of the forward frame section 10 and the axle assembly 30 so as to space the forward frame section above the supporting wheels 16 at a desired level. The hydraulic cylinder means 50 can be controlled to retract or extend the vertical distance between the forward frame section and the axle assembly. It can be seen that vertical movements of the forward frame section 10 relative to the axle assembly 30 results in vertical movements of the yoke 54 about its pivot point 55. Since the yoke includes a trailing portion 57, which is rigidly set at an angle to the forward part of the yoke, vertical movements of the yoke in combination with vertical movements of the connecting arms 28 result in changes of the angular position of the axle assembly about a horizontal axis through the length of the assembly. The hydraulic cylinder means 50 is also connected to a control system, which will be described in greater detail below and which automatically adjusts the level of the forward frame section 10 in response to relative vertical movements of that section to the rear frame section 12. The purpose of the control system is to maintain the earth working blade 20 at a preset working level irrespective of varying contours in the earth surface as measured by the relative positions of the forward frame section 10 and the rear frame section 12.

The axle assembly 30, which is connected to the supporting wheels 16 at its terminal ends, is made up of spaced bar members 56 and 58 which are rigidly affixed to an upright transverse spacing member 60. The three transverse members 56, 58 and 60 may be welded together throughout their adjoining lengths so as to form a channel which has an open face at its forward end, and the trailing part 57 of the yoke 54 is received in the forward opening of the channel-shaped axle assembly 30. The connection of the yoke means 54 to the axle assembly channel is more clearly shown in FIGURE 11 where ball and plate mounting means 62 is provided for permitting pivotal movements between the yoke 54 and the axle assembly 30.

FIGURE 4 illustrates the placement of the connecting arms 28 and the yoke member 54 relative to the axle assembly as viewed on line 4—4 of FIGURE 1, looking toward the rear of frame section 12. In this view, the open face of the channel which makes up the axle assembly 30 is shown in a position which turns downwardly toward the earth, and this represents the position of the axle assembly when the blade 20 is in one of its lowered positions relative to the earth.

Figure 7:
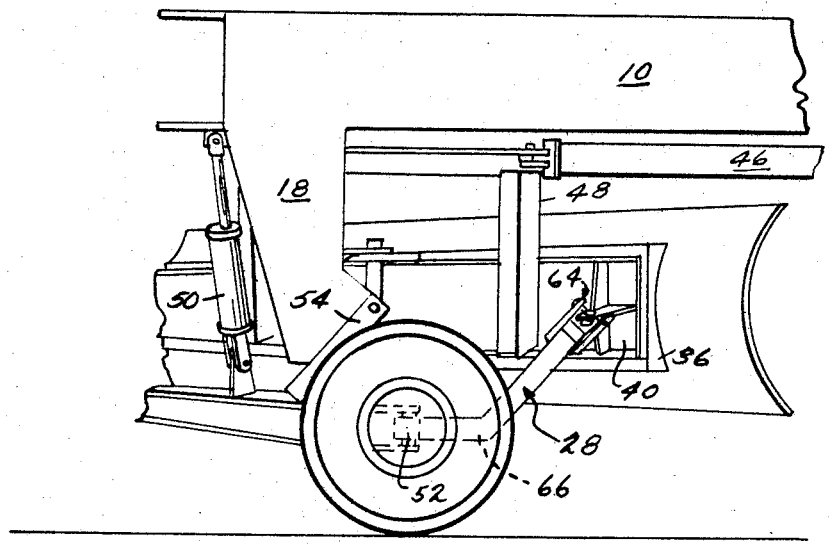
FIGURE 7 is a side elevational view showing the detailed connections between the earth working blade and the supporting wheels for the raised position of the blade.

FIGURES 5 through 10 illustrate in detail the various positions of the working blade 20 and its relationship to the supporting wheels 16 for different angles and levels of cut for the blade. FIGURES 5 through 7 illustrate the tracking position of the wheels 16 as related to the working blade when the blade is at a raised, non-cutting level but where the blade has been rotated about a vertical axis placing it at an angle relative to its normal full width line of travel. For such a raised position of the blade, the wheels 16 remain in vertically upright positions for trailing behind the blade. However, as shown in FIGURE 5, the wheels effectively narrow their track in proportion to the angular rotation of the cutting blade 20 about its vertical mounting axis 42. Since the blade means is interconnected to the axle assembly 30 through the connecting arms 28, a parallelogram relationship is established between the blade, the axle assembly, and the spaced connecting arms. The connecting arms 28 are pivotally linked to the blade backing member 40 so that angular rotations of the blade about its vertical mounting axis result in similar angular displacement of the axle assembly 30 and the supporting wheels 16 carried at opposite ends of the axle assembly. As mentioned above, the angular displacement of the blade is accomplished through the two hydraulic cylinder means 46 which can be separately extended and retracted to accommodate the required angular setting of the blade. The hydraulic control lines and valving devices associated therewith have been omitted from the drawings so as to more clearly illustrate the invention. The hydraulic control systems are entirely conventional and include necessary lines, reservoirs and actuating mechanisms normally associated with such systems. Such a setting of the blade, as shown in FIGURES 5 through 7, may be desired for transporting the land leveler from one working site to another, where it is desirable to reduce the overall width of the land leveler and the blade carried by it. For such transporting requirements, it is desirable that the supporting wheels 16 remain in their normally upright positions, since no banking movements are required to counteract an actual removal of earth by the main blade 20. Therefore, the connecting arms 28 are constructed to effectively adjust the tracking width of the supporting wheels 16 without changing the normal upright position of such wheels at the ends of their stub axles 52 when the blade is in its raised position. FIGURE 6 illustrates the relationship between the stub axles 52 and the forwardly extending connecting arms 28 when the blade is raised above the earth in a non-cutting position. FIGURES 5 and 7 also illustrate ball joint couplings 64 which connect the forward ends of the connecting arms 28 to the blade backing member 40 so that the blade may be rotated about its vertical axis while providing for a pivotal linkage between the parallelogram elements described above. Additionally, the ends of the axle assembly 30 are pivotally linked to portions of the stub axles 52 so that the supporting wheels 16 will trail in alignment with the longitudinal axis of the forward frame section for all angular positions of the blade 20.

FIGURES 8 through 10 illustrate the relationship between the blade means 20 and the supporting wheels 16 when the blade is lowered for an earth working operation. The angular position of the blade about its vertical axis is similar to that shown for FIGURES 5 through 7, and accordingly, the track of the supporting wheels 16 is similar to that shown for the raised position of the blade 20. However, when the blade is lowered to a working level, the supporting wheels 16 are automatically tilted or banked out of their normally vertical upright positions so as to counteract lateral stresses applied to the blade means 20 while it is cutting through the earth. It can be appreciated that in the angular position of the blade shown, there is a tendency for the entire land leveler to shift lateraly in response to the force of earth against the oblique cutting surface of the blade 20. The direction of lateral shift is determined by a component of forces acting on the angled blade; and in the position of the blade shown for FIGURE 8, there would be a tendency for the forward frame section to shift in a direction to the right of the land leveler when looking toward the front of the land leveler. In order to counteract the tendency for the blade and the land leveler to shift laterally, the supporting wheels 16 are banked, as shown, to resist such lateral movement. The automatic banking of the wheels 16 is accomplished through the particular configuration of the connecting arms 28 as related to the stub axles 52. By comparing FIGURES 7 and 10, it can be seen that the connecting arms 28 include an angular section 66 which remains at an approximate horizontal level for the raised position of the blade 20. However, when the blade 20 is lowered by the hydraulic cylinder means 50, the angled portion 66 of the connecting arm 28 moves into the position shown in FIGURE 10. Since the connecting arms 28 are rigidly connected to the stub axles 52, the vertical movement of the arm portion 66 adjusts the angle of the stub axles 52 and the wheels 16 which are mounted at their ends. It should be noted that the particular configuration of the connecting arms 28 does not affect the normally vertical placement of the wheels 16 when the blade 20 is lowered and in its full width cutting position as shown in FIGURE 2. In such a cutting position, no appreciable lateral forces are affecting the cutting operation, and there is no necessity for banking the wheels 16 in any direction.

FIGURE 11 illustrates in schematic form a control system for translating movements of the rear frame section 12 as related to the forward frame section 10 into automatic leveling movements of the working blade 20 so as to maintain that blade at a substantially constant level irrespective of changes in contour encountered by the rear wheels 22 of the rear frame section 12. The rear frame section 12 is pivotally connected to the forward frame section 10 so that it may swing laterally about a vertical pivot determined by the mounting post 68 and also so that it may swing up and down about the horizontal axis of a separate mounting post 70. A control lever arm 34 is connected to the mounting post 68 of the forward frame section so as to trail rearwardly along the side of the rear frame section 12 as illustrated. The control arm 34 can be fixed in a horizontal plane by setting a hydraulic control cylinder 72 at a desired level. The hydraulic control cylinder 72 may be operated by hydraulic control devices carried by the tractor so that the level control functions can be actuated manually by the operator of the propelling vehicle, but when it is desired to control the level of the blade automatically, it is necessary to set the cylinder 72 into a rigid position to fix the control lever arm 34 relative to the forward frame section 10. The hydraulic flow lines and pumping means necessary for such actuation are not illustrated in the drawings since they do not separately involve any invention. The control arm 34, when set in a fixed position relative to the forward frame section 10, moves about the horizontal pivotal axis 70 so as to always remain in alignment with the longitudinal horizontal plane of the forward frame section 10. Since the rear frame section 12 may rise and fall relative to the forward frame section 10 in response to contours in the earth as encountered by any of the supporting wheels of the two frame sections or of the drawing vehicle, the lever arm 34 will change its vertical position alongside of the rear frame section 12. Switching devices 74 and 76 are carried in a side wall of the rear frame section 12 so as to receive such vertical movements of the terminal ends of the control arm 34, and the switching devices actuate suitable systems for raising and lowering the hydraulic cylinder member 50 which raises and lowers the forward frame section 10 relative to the supporting wheels 16. For example, when the rear frame section 12 is lower than the forward frame section 10, the control lever arm 34 will approach a contact with the upper switch means 74. When contact is made with that switch, a circuit is closed through a solenoid valve means, shown generally at 78, which causes hydraulic fluid to flow from the cylinder 52 so as to retract the cylinder and to effectively lower the blade means 20. On the other hand, when the rear frame section is raised relative to the forward frame section, the control lever arm 34 contacts the lower switch means 76, and the solenoid valve means 78 is actuated to cause an extension of the cylinder 52 and a raising of the blade means 20.

Referring to FIGURE 12, which is a cross sectional view of the rear frame section 12 at the mounting point of the switching means 74 and 76, it can be seen that the switches can be manually adjusted toward and away from each other so as to provide for greater or lesser control of the blade means 20. A threaded member 80 having a head portion 82 carries the separate switches 74 and 76. The threaded member 80 includes threads at two opposite pitches for each of the switch members whereby a turning movement of the head 82 will result in the two switch means being moved toward or away from each other depending upon the rotational direction of movement of the head 82. Thus, there is provided a manual adjustment means for setting the amount of movement that is required of the rear frame section 12 relative to the forward frame section 10 before control functions cause the earth working blade 20 to move up or down.

It will be appreciated that the inventive concepts embodied in the constructions just described may be varied and applied to other types of earth working equipment. It is contemplated that the blade mounting arrangement with the means for adjusting the width and bank of supporting wheels can be applied to any earth working vehicle whether it comprises one or two frame sections. Additionally, the control arm lever and the system associated therewith can be used with any articulated vehicle where it is desired to automatically control the level of a working device carried by such a vehicle. The present invention has been described with particular reference to the use of hydraulic cylinders for raising and lowering various components of the land leveler, but other mechanical devices could be substituted for the hydraulic cylinder means and the same function could be provided with such substituted devices. Other variations in this invention will become obvious to those skilled in the art, and such variations are intended to be included within the scope of this invention.

What is claimed is:
1. Land leveler apparatus comprising:
   a forward frame section for carrying an earth working blade means,
   a rear frame section pivotally connected to said forward frame section for pivotal movements about horizontal and vertical axes relative to the forward frame section,
   pivotal mounting means for mounting said earth working blade means to said forward frame section so that rotational movements can be applied to said earth working blade in vertical and horizontal planes, and
   supporting wheels connected to said forward frame section for supporting said forward frame section, said supporting wheels being adjustable relative to said forward frame section in a vertical direction, whereby up and down vertical movements of said forward frame section relative to said wheels raises and lowers said earth working blade relative to the earth over which the land leveler is passing, and said supporting wheels being connected to said earth working blade through connecting arm means between the earth working blade means and said supporting wheels, said connecting arm means providing for an adjustment of the width of track between said supporting wheels in proportion to the cutting width of said earth working blade as measured at right angles to the longitudinal axis of said forward frame section.

2. The land leveling apparatus of claim 1 wherein said supporting wheels are connected to the terminal ends of an axle assembly spaced rearwardly from and parallel to said earth working blade means, with said connecting arm means pivotally linking the ends of said earth working blade means with the ends of said axle assembly so as to form a parallelogram with the earth working blade means and said axle assembly, whereby angular movements of said earth working blade about a vertical axis causes angular movements of said axle assembly which effectively adjust the tracking width between the supporting wheels carried at the ends of the axle assembly.

3. The land leveler apparatus of claim 1 wherein said earth working blade is adjustable about vertical and horizontal axes, and including means for adjusting said earth working blade about said axes.

4. The land leveler apparatus of claim 1 wherein said connecting arm means maintain said supporting wheels within the cut of the earth working blade for all angular positions of said blade.

5. The land leveler apparatus of claim 1 and including means for banking said supporting wheels in proportion to the angle of cut for which sadi earth working blade is set in its vertical pivotal axis.

6. The land leveler apparatus of claim 1, and including:
control means carried by said forward frame section, and in contact with said rear frame section for receiving vertical elevational movements of said rear frame section relative to said forward frame section, said movements being translated by switch means carried by said rear frame section into movements which raise and lower said forward frame section relative to the earth.

7. The land leveler apparatus of claim 1, and including an auxiliary blade means carried by said rear frame section.

8. Land leveler apparatus comprising:
a forward frame section for carrying an earth working blade means, said earth working blade being adjustable about vertical and horizontal pivotal axes relative to the forward frame section,
a rear frame section connected to said forward frame section for pivotal movements about horizontal and vertical axes.
control means carried by said forward frame section, and in contact with said rear frame section for receiving vertical elevational movements of said rear frame section relative to said forward frame section, said movements being translated by switch means carried by said rear frame section into movements which raise and lower said forward frame section relative to the earth, and
supporting wheels connected to said forward frame section, said wheels being adjustable relative to said forward frame section in a vertical direction whereby up and down vertical movements of said forward frame section relative to said wheels raises and lowers said earth working blade relative to the earth, and said supporting wheels being connected to said earth working blade through connecting arm means between said earth working blade and said supporting wheels, said connecting arm means thereby providing for an adjustment of the width of track between said wheels in proportion to the cutting width of said blade as measured at right angles to the longitudinal axis of said forward frame section.

9. The land leveler apparatus of claim 8 wherein said connecting arm means provide for a banking movement of said supporting wheels when said blade is in a lowered cutting position and at an angle to its normal maximum cutting width.

10. The land leveler of claim 8 wherein said control means includes a control arm which extends rearwardly alongside of said rear frame section for actuating said switch means upon vertical movements of said rear frame section relative to said forward frame section.

11. In land leveler apparatus having a frame for carrying an adjustable earth working blade means and including supporting wheels for supporting said frame above the earth, with adjustable connecting means being provided between said frame and said supporting wheels for raising and lowering the frame and the earth working blade means relative to the earth over which said wheels are traveling, the improvement comprising:
connecting arm means extending between said earth working blade and said supporting wheels for banking said supporting wheels in proportion to the angle of cut of said earth working blade as the blade is rotated about a vertical axis out of its normal maximum cutting width position.

12. The improvement of claim 11 and including an axle assembly means between said supporting wheels for maintaining said wheels in proper trailing position relative to said blade means, and said connecting arm means providing a parallelogram relationship between said earth working blade means and said axle assembly means.

13. The improvement of claim 11 wherein said connecting arm means include trailing portions angled relative to the forward portions of said connecting arm means, said trailing angled portions being rigidly connected to stub axle means carrying said supporting wheels, whereby said supporting wheels are banked only when said earth working blade means is in a lowered working position.

References Cited

UNITED STATES PATENTS

| | | | |
|---|---|---|---|
| 924,966 | 6/1909 | Clemons | 37—163 |
| 1,340,497 | 5/1920 | Pile | 37—178 |
| 2,266,625 | 12/1941 | Cundiff | 37—163 |
| 2,282,752 | 5/1942 | Arndt | 37—157 |
| 2,719,369 | 10/1955 | Lindbeck | 37—180 X |
| 2,792,651 | 5/1957 | Hobday. | |
| 2,842,874 | 7/1958 | Shumaker et al. | 37—153 |
| 2,881,541 | 4/1959 | Darnell | 37—180 X |
| 3,080,666 | 3/1963 | Murray et al. | 37—180 |
| 3,353,288 | 11/1967 | Waterson | 37—180 |

ABRAHAM G. STONE, *Primary Examiner.*

ALAN E. KOPECK, *Assistant Examiner.*

U.S. Cl. X.R.

172—398